(12) United States Patent
Dunigan et al.

(10) Patent No.: US 9,365,228 B2
(45) Date of Patent: Jun. 14, 2016

(54) COAST CONTROL SYSTEMS AND METHODS

(71) Applicants: Robert Clay Dunigan, Benson, NC (US); Jeff Monico, Grimesland, NC (US); Alex Evans, Greenville, NC (US); Allen Brock, Greenville, NC (US); Lisa French, Greenville, NC (US)

(72) Inventors: Robert Clay Dunigan, Benson, NC (US); Jeff Monico, Grimesland, NC (US); Alex Evans, Greenville, NC (US); Allen Brock, Greenville, NC (US); Lisa French, Greenville, NC (US)

(73) Assignee: Hyster - Yale Group, Inc., Fairview, OR (US)

( * ) Notice: Subject to any disclaimer, the term of this patent is extended or adjusted under 35 U.S.C. 154(b) by 103 days.

(21) Appl. No.: 14/245,739

(22) Filed: Apr. 4, 2014

(65) Prior Publication Data
US 2014/0303867 A1 Oct. 9, 2014

Related U.S. Application Data

(60) Provisional application No. 61/810,000, filed on Apr. 9, 2013.

(51) Int. Cl.
*B62B 5/04* (2006.01)
*B60T 7/14* (2006.01)
*B66F 9/20* (2006.01)
*B62D 51/00* (2006.01)

(52) U.S. Cl.
CPC ............... *B62B 5/0414* (2013.01); *B60T 7/14* (2013.01); *B66F 9/20* (2013.01); *B62D 51/002* (2013.01)

(58) Field of Classification Search
CPC ........... B62B 5/0414; B60T 7/14; B66F 9/20; B62D 51/002
USPC ................... 180/19.2; 188/156, 161, 163, 21
See application file for complete search history.

(56) References Cited

U.S. PATENT DOCUMENTS

| 6,464,025 | B1 * | 10/2002 | Koeper | B62B 5/06 180/19.2 |
| 2006/0245866 | A1 * | 11/2006 | Rose | B60T 7/14 414/392 |

FOREIGN PATENT DOCUMENTS

DE 202014003020 U1 * 8/2014 ............... B60T 7/14

* cited by examiner

*Primary Examiner* — Melanie Torres William

(57) ABSTRACT

In one embodiment, a coast control system, or dead-man brake inhibitor, is associated with a tiller arm that is used for steering a vehicle. A spring acts upon the tiller arm when an operator releases a control handle attached to the tiller arm to move the tiller arm to a braking position which causes an electronically or mechanically actuated brake to be applied. Before releasing the control handle, the operator may actuate the coast control system to inhibit movement of the tiller arm towards the braking position when the control handle is released. The operator may vertically reposition the tiller arm while the coast control system remains actuated by overcoming the inhibiting force applied by the coast control system when the tiller arm is moved toward the braking position and by overcoming the spring acting on the tiller arm when the tiller arm is moved away from the braking position.

17 Claims, 7 Drawing Sheets

COAST CONTROL SYSTEMS AND METHODS

RELATED APPLICATIONS

The present disclosure is a non-provisional of and claims priority to, U.S. patent application Ser. No. 61/810,000, titled "Coast Control Systems And Methods" and filed on 9 Apr. 2013, which is incorporated by reference in its entirety.

TECHNICAL FIELD

The present disclosure relates to dead-man brake mechanisms, and to inhibiting movement of a dead-man brake mechanism to a braking position.

BACKGROUND

Dead-man brake mechanisms are commonly used to apply a vehicle's brakes when an operator ceases applying force to a vehicle component. In some industries, there are operational situations where it is desirable to override the dead-man brake mechanism such that the brakes are not applied when an operator ceases applying force to a vehicle component.

SUMMARY

In one embodiment, a coast control system, or dead-man brake inhibitor, is associated with a tiller arm that is used for steering a vehicle. A spring acts upon the tiller arm when an operator releases a control handle attached to the tiller arm to move the tiller arm to a braking position which causes an electronically or mechanically actuated brake to be applied. Before releasing the control handle, the operator may actuate the coast control system to inhibit movement of the tiller arm towards the braking position when the control handle is released. The operator may vertically reposition the tiller arm while the coast control system remains actuated by overcoming the inhibiting force applied by the coast control system when the tiller arm is moved toward the braking position and by overcoming the spring acting on the tiller arm when the tiller arm is moved away from the braking position.

DETAILED DESCRIPTION

Figure 1:
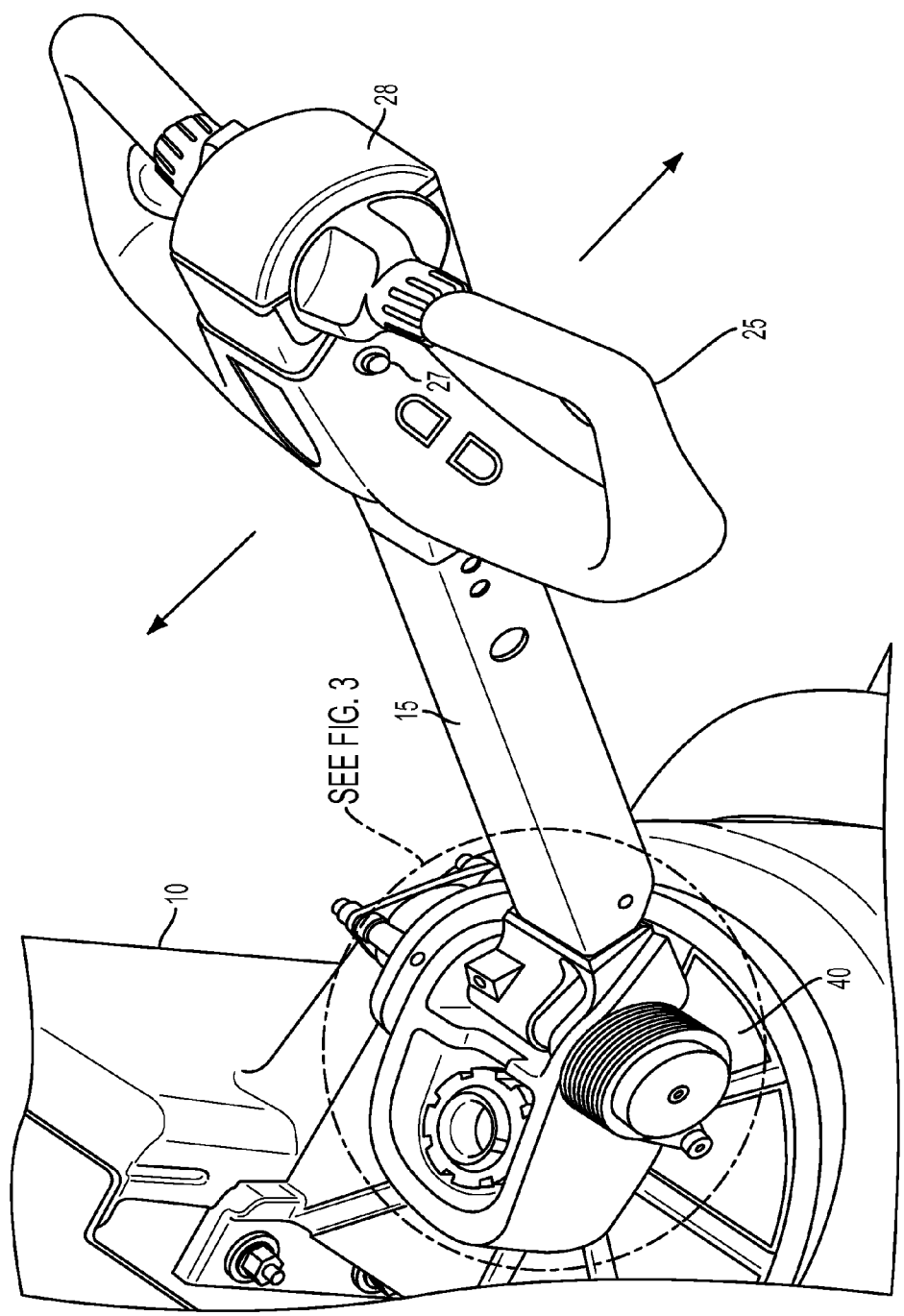
FIG. 1 illustrates a right top orthogonal view of an exemplary dead-man brake inhibitor linked to a tiller arm.
Figure 5:
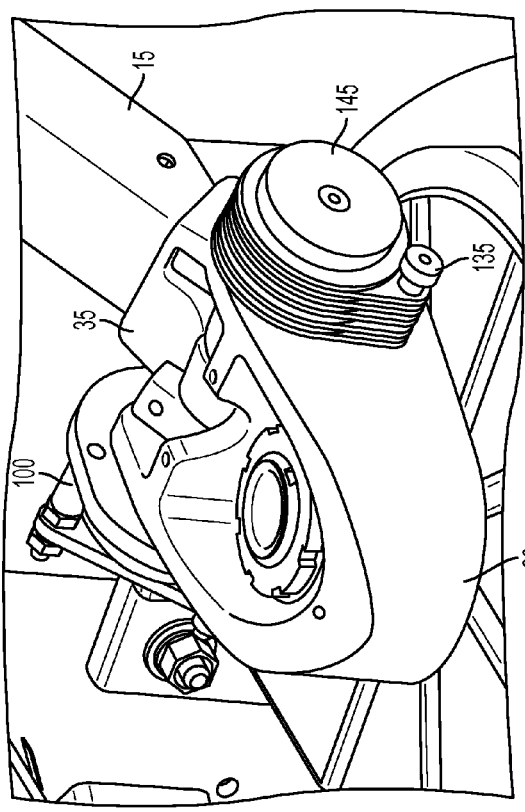
FIG. 5 illustrates a close-up right orthogonal view of the dead-man brake inhibitor of FIG. 1 with the tiller arm moved to the left.
Figure 2:
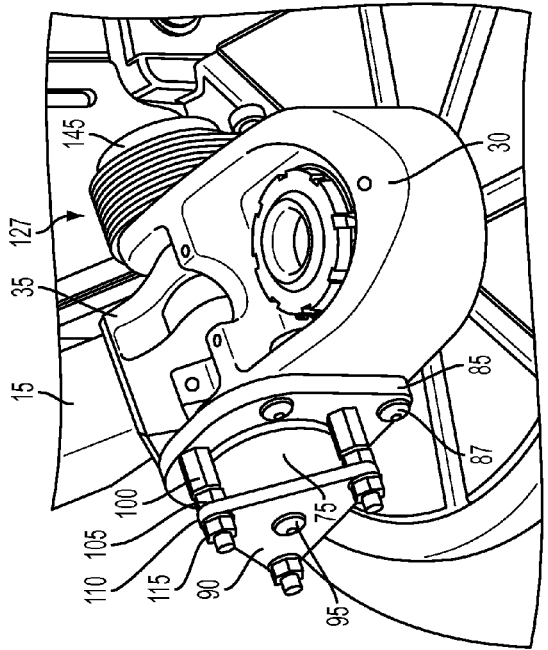
FIG. 2 illustrates a close-up left orthogonal view of the dead-man brake inhibitor of FIG. 1 with the tiller arm moved to the right.
Figure 3:
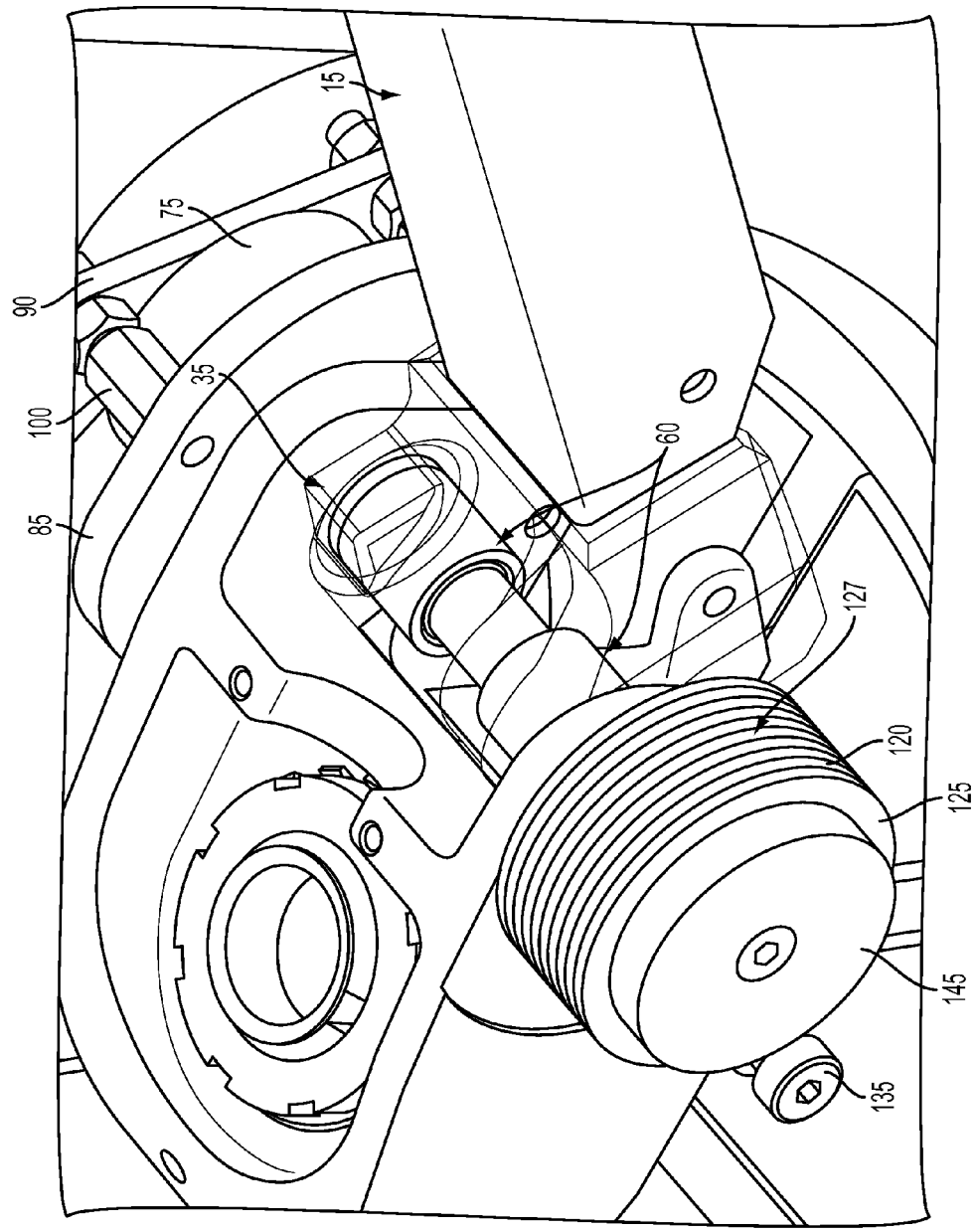
FIG. 3 illustrates a close-up right orthogonal view of the dead-man brake inhibitor of FIG. 1 with a pivot housing removed to show interior details of the dead-man brake inhibitor.

There may be situations where it is desirable to override or hinder a dead-man braking mechanism. The following description relates to a vehicle equipped with a spring applied dead-man brake that engages when an operator releases a control handle. While a pallet truck 10 is described, the invention set forth by the claims is not so limited, but may be used with any suitable vehicle equipped with a dead-man brake.

With reference to FIGS. 1-7, a pallet truck 10 includes a steering device, such as tiller arm 15, that is moved by a biasing device, such as a gas spring (not illustrated for clarity), to an upright braking position (FIG. 7) when an operator releases the control handle 25. The gas spring acting upon the tiller arm 15 constitutes the dead-man braking mechanism for the pallet truck 10. The tiller arm 15 has a range of vertical angular motion (commonly between 90 and 0 degrees vertically, FIGS. 7A and 7B, respectively). When the tiller arm 15 is near 0 or 90 degrees, the pallet truck 10 enters a braking mode to stop motion or remain stationary. If the operator releases the tiller arm 15 (simply by letting go of the control handle 25), the tiller arm 15 will move to the 90 degree position by virtue of the gas spring. Typically, when the tiller arm 15 is at or near 0 or 90 degrees the brake of the pallet truck 10 is electrically activated.

The present inventors have recognized that pallet truck operators may more efficiently load the pallet truck 10 by permitting the pallet truck 10 to coast from one loading station to another while the operator retrieves items from the loading stations. However, with a dead-man brake mechanism such as a gas spring, or other suitable device, when the operator releases the control handle 25 the pallet truck 10 is braked and prevented from coasting to the next loading station. The described coast control system and methods permit the pallet truck 10 to coast a short distance or slowly jog forward to aid order selection, loading, or both.

When the described coast control mechanism is activated, for example, by pressing a button 27 to generate an inhibition or activation signal, the gas spring is hindered from moving the tiller arm 15 to the 90 degree braking position. For example, the operator may engage the coast control mechanism by depressing the button 27 on the side of the control handle 25. After the button 27 is depressed, the tiller arm 15 may be restricted or hindered from moving toward the upright braking position (FIG. 7A), preferably without preventing the tiller arm 15 from reaching the upright braking position as described below. Subsequent pressing of the button 27 generates an operator interaction signal and may jog the pallet truck 10 forward a short distance, that is, actuate a traction motor or other suitable device, while maintaining, or substantially maintaining, the vertical position of the tiller arm 15 between the 90 degree position and the 0 degree position. Other suitable interaction signals may be generated, for example, by repositioning the tiller arm 15 when the coast control is active. In some embodiments, the coast control device may be disengaged by depressing either a rabbit button (on the grab rail), the belly button 28, or by forcing the tiller arm 15 to either the upper or lower brake region (90 or 0 degrees). In some embodiments, the maximum vehicle speed may be limited when in the coast control mode.

In some embodiments, when the coast control mode is engaged the tiller arm 15 is retained at the last vertical position at which the operator left the tiller arm 15 prior to releasing the control handle 25. In other embodiments, when the coast control mode is engaged the tiller arm 15 is inhibited from moving quickly to the upper braking position by creeping toward the upper braking position from the last vertical position at which the operator left the tiller arm 15 prior to releasing the control handle 25. In other embodiments, when the coast control mode is engaged the tiller arm 15 may move from the last vertical position at which the operator left the tiller arm 15 prior to releasing the control handle 25 toward the upright braking position until reaching one of a number of predefined coasting positions where the tiller arm may pause, or hold, for a predetermined time period in some embodiments. In other embodiments, when the coast control mode is engaged the tiller arm 15 may be delayed from moving from the last vertical position at which the operator left the tiller arm 15 prior to releasing the control handle toward the upright braking position for a predetermined amount of time.

With reference to FIGS. 2-6 an exemplary embodiment is described. The tiller arm 15 is mechanically linked to a steered wheel (not illustrated) via tiller swivel 30 such that rotating the tiller arm 15 about a vertical axis causes the steered wheel to rotate. The tiller arm 15 is pivotally connected to a steering housing, such as the tiller swivel 30, via the tiller pivot housing 35 such that the tiller arm 15 may be positioned by an operator in various vertical positions between, and including, a 0 degree braking position and a 90 degree braking position. The tiller pivot housing 35 is linked to a brake assembly, such as a dead-man brake inhibitor 40 (FIG. 1).

A dead-man brake mechanism is provided by a gas spring being connected between the tiller arm 15 and the tiller swivel 30 such that the gas spring urges the tiller arm 15 toward the 90 degree braking position. The dead-man brake inhibitor 40 is normally in an off, or inactive, condition such that when an operator releases the control handle 25 the tiller arm 15 moves to the 90 degree braking position relatively quickly.

Figure 4:
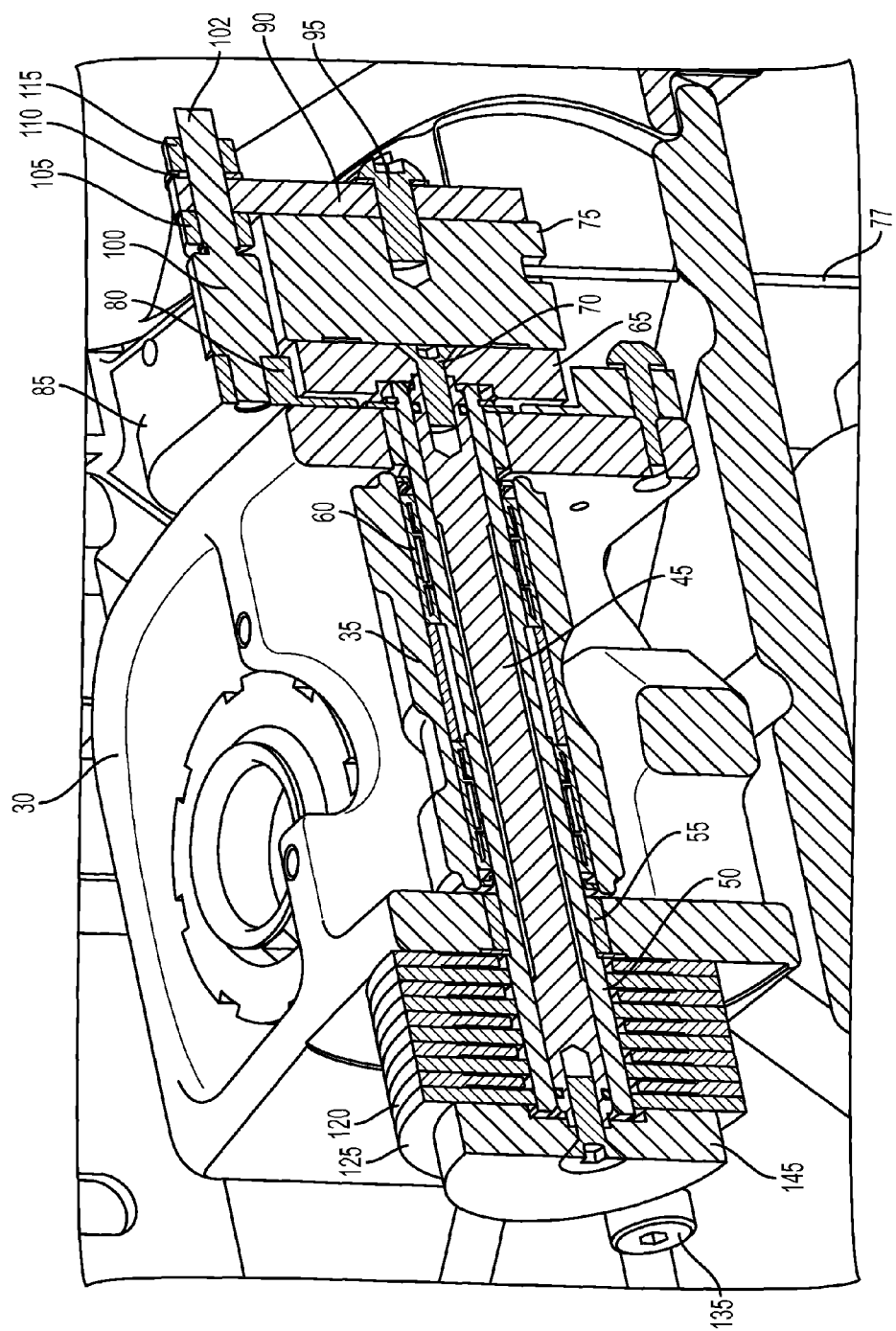
FIG. 4 illustrates a close-up right orthogonal sectional view of the dead-man brake inhibitor of FIG. 1.

The dead-man brake inhibitor 40 includes an actuator shaft 45 rotationally and slidingly received by an externally splined shaft 50 (FIG. 4). Splined shaft 50 is received by bearings 55 for rotational movement about the longitudinal axis of the splined shaft 50 with respect to the tiller swivel 30.

The splined shaft 50 also engages internally splined one way roller clutches 60 that are non-rotationally affixed to the tiller pivot housing 35 for rotation with the pivot housing 35. The one way roller clutches 60 are preferably arranged such that moving the tiller arm 15 up toward the 90 degree braking position causes the splined shaft 50 to rotate about its longitudinal axis while moving the tiller arm 15 down toward the 0 degree braking position does not cause the splined shaft 50 to rotate about its longitudinal axis. In other words, torque is transmitted from the tiller arm 15 to the splined shaft 50 when the tiller arm 15 is moved toward the 90 degree braking position and torque is not transmitted from the tiller arm 15 to the splined shaft 50 when the tiller arm 15 is moved toward the 0 degree braking position.

A first end of the actuator shaft 45 is affixed to a piston 65, for example, via a screw 70, such that translational movement of the piston 65 causes longitudinal translation of the actuator shaft 45 as described below. Piston 65 is moved by electromagnet 75 as also described below. In the illustrated embodiment, the piston 65 is slidingly retained by a lip 80 of a piston plate 85 such that the piston 65 may move towards and away from the tiller swivel 30.

The piston plate 85 is secured to the tiller swivel 30 via screws 87 (FIG. 2) and the electromagnet 75 is secured to a retaining plate 90 via a screw 95. Magnet posts 100 are connected to the piston plate 85, for example, via a threaded connection. The combined electromagnet 75 and retaining plate 90 are secured to the piston plate 85 via magnet posts 100. For example, a first nut 105 may be threaded onto extended portion 102 of each magnet post 100 (FIG. 4). Each magnet post 100 passes through an aperture in the retaining plate 90 and a lock washer 110 and a second nut 115 secures the retaining plate 90 against the set of first nuts 105. By adjusting the position of the first nuts 105 on the extended portions 102 of the magnet posts 100, the distance between the electromagnet 75 and the piston 65 may be adjusted to permit a greater or lesser amount of movement for the piston 65. For example, in one embodiment the distance between the electromagnet 75 and the piston 65 is in the range of approximately 0.1 mm to approximately 1.5 mm, and preferably in the range of approximately 0.2 mm to approximately 0.25 mm. While an electromagnet 75 and piston 65 are shown and described as a preferred embodiment, other suitable brake actuators may be used.

Figure 6:
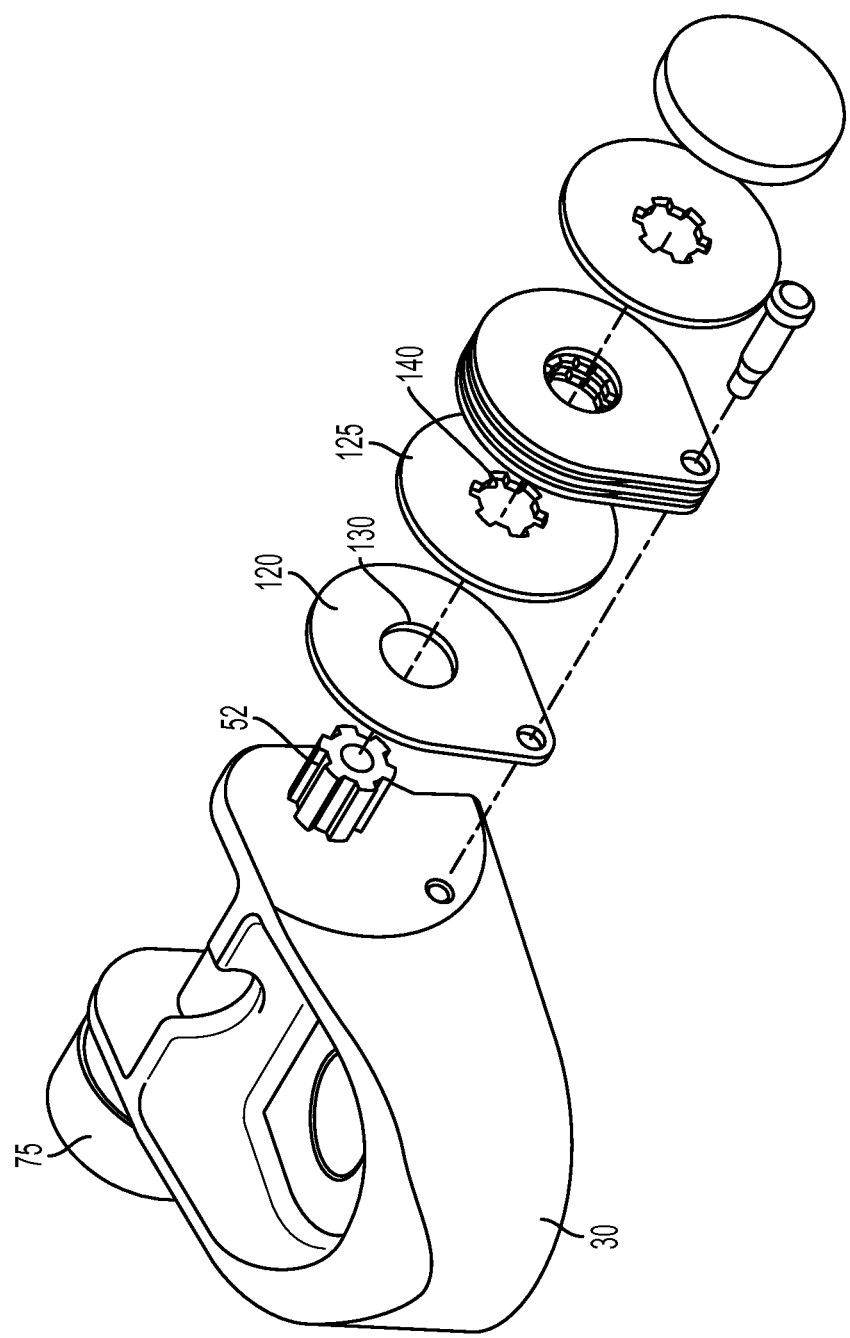
FIG. 6 illustrates a partial assembly view of the dead-man brake inhibitor of FIG. 1.
Figure 7A:
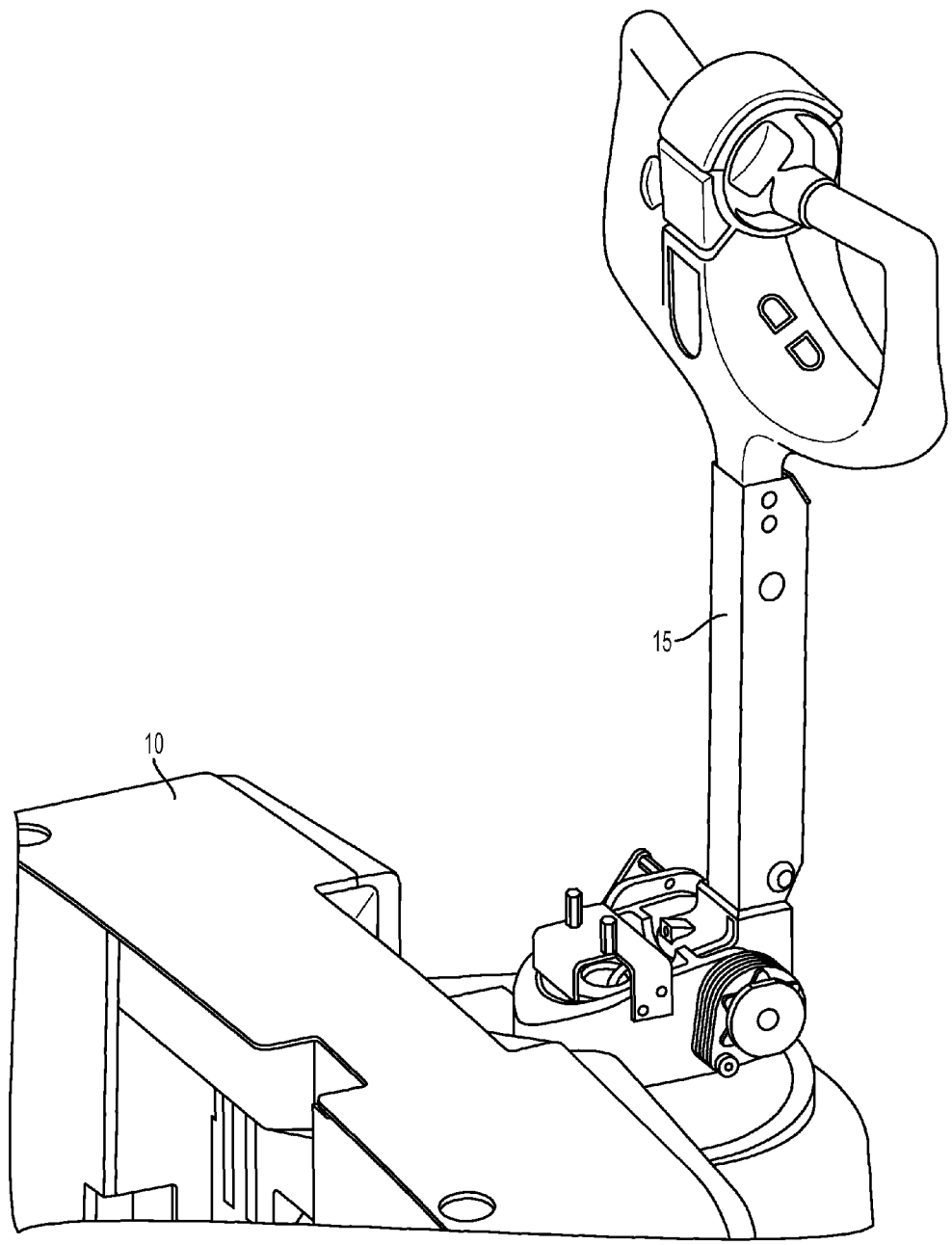
FIG. 7A illustrates a tiller arm at a top, or 90 degree, braking position.
Figure 7B:
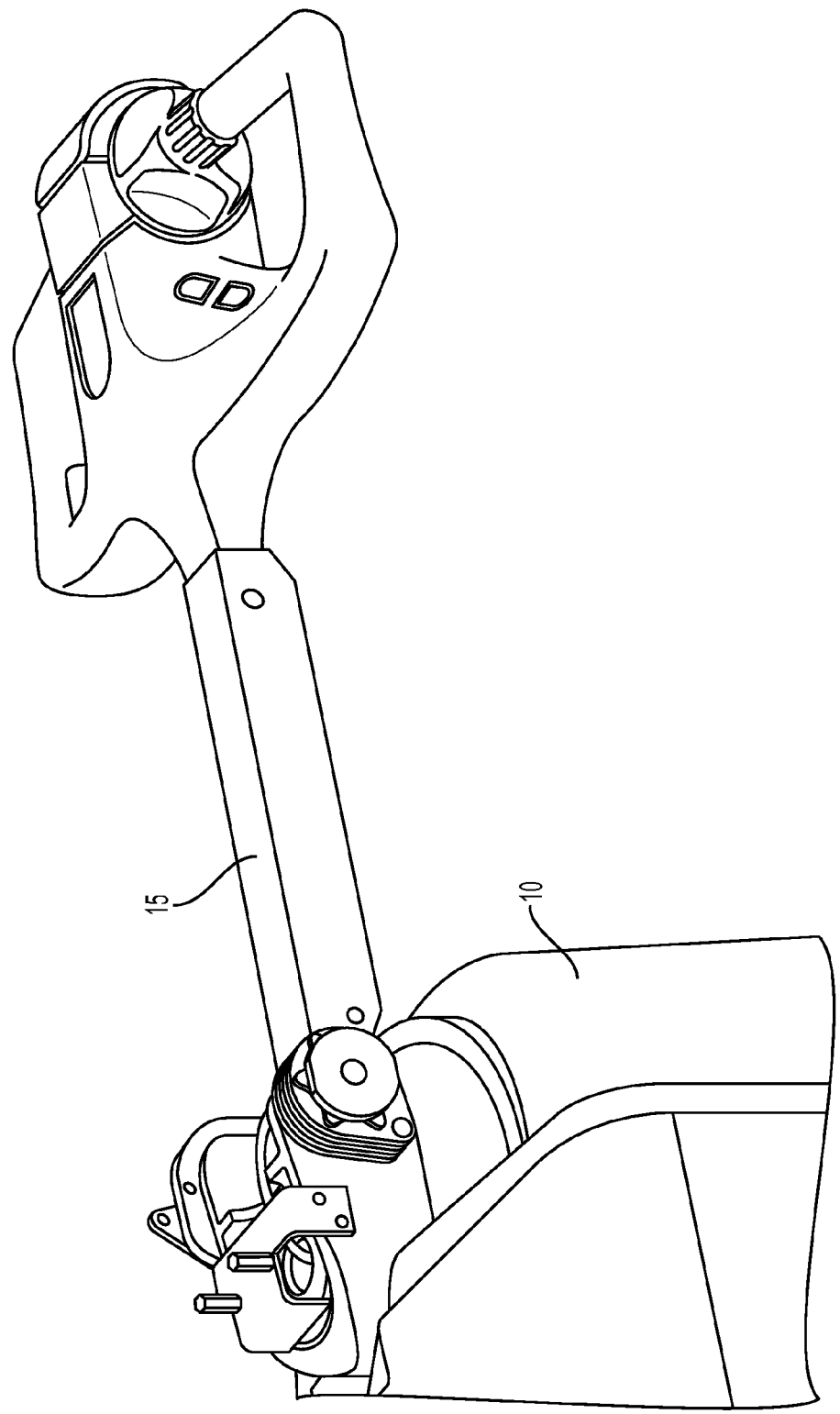
FIG. 7B illustrates a tiller arm at a bottom, or 0 degree, braking position.

Opposite to the first end of the actuator shaft 45, the splined shaft 50 bears at least one rotationally stationary disk 120 and one rotating disk 125. For example, the rotationally stationary disk 120 may include an aperture 130 sized and shaped to fit over the splined shaft 50 without engaging the splines 52 (FIG. 6). The rotationally stationary disk 120 may also be affixed to the tiller swivel 30 via a pin 135 such that the rotationally stationary disk 120 slides along the longitudinal axis of the pin 135 and is constrained from rotating about the longitudinal axis of the splined shaft 50 by the pin 135. The rotating disk 125 may include an aperture 140 that is shaped and sized to fit over the splined shaft 50 and to engage the splines 52 such that rotation of the splined shaft 50 causes rotation of the rotating disk 125.

More than one rotationally stationary disk 120 and one rotating disk 125 may be included. For example, an alternating, even number of rotationally stationary disks 120 and of rotating disks 125 may be provided, or an alternating, uneven number of rotationally stationary disks 120 and of rotating disks 125 may be provided, that is more of either rotationally stationary disks 120 or of rotating disks 125 may be included. In some embodiments, a friction surface may be provided on the tiller swivel 30 and a single rotating disk 125 may be borne by the splined shaft 50.

An end cap 145 is affixed to the second end of the actuator shaft 45 to prevent the rotationally stationary disks 120 and the rotating disks 125 from sliding off of the splined shaft 50 and to create a braking force as described below. While a clutch-type brake arrangement is shown and described as a preferred embodiment, other suitable brake arrangements may be used.

In the illustrated embodiment, the dead-man brake inhibitor 40 is equipped with two roller clutches 60 that allow torque transmission from the tiller arm 15 to the splined shaft 50 as the tiller arm 50 is pushed upward, that is, toward the 90 degree braking position. The actuator shaft 45 is free to rotate within the splined shaft 50 and to slide laterally along the longitudinal axis of the splined shaft 50. The piston 65 attached to the first end of the actuator shaft 45 is drawn toward the electromagnet 75 when electrical power is supplied to the electromagnet, for example, via wire 77. Application of electrical power to the electromagnet 75 is preferably controlled by a processor (not illustrated). The magnetic attraction of the piston 65 to the electromagnet 75 generates a coaxial tensile force on the actuator shaft 45 which is transmitted to the end cap 145. By varying the magnitude of electrical power supplied to the electromagnet 75, the processor may vary the coaxial tensile force on the actuator shaft 45, for example, by increasing the magnitude of electrical power to increase the coaxial tensile force, and vice versa. In some embodiments, the gap between the electromagnet 75 and the piston 65 may also be varied, for example, be preset to a different distance, to vary the coaxial tensile force on the actuator shaft 45.

End cap 145 is positioned proximate to, and may be in contact with, one of the rotating disks 125 in the disk array 127. The coaxial tensile force created in the actuator shaft 45 by the electromagnet 75 attracting the piston 65 toward the electromagnet 75 creates a compressive force applied by the end cap 145 that squeezes the rotating disks 125 against the stationary disks 120. The compressive force thus causes frictional braking among the rotating disks 125 and the stationary disks 120. Because the rotating disks 125 engage the splines 52 of the splined shaft 50, a torsional resistance against rotating the splined shaft 50 about its longitudinal axis is generated.

In some embodiments, the torsional resistance created by the disk array 127 and acting on the splined shaft 52 is greater than the torsional moment created by the gas spring acting on the tiller arm 15. Thus, the net result is that the tiller arm 15 remains at whatever vertical position the operator left the tiller arm 15 when the dead-man brake inhibitor 40 was activated.

In other embodiments, the torsional resistance created by the disk array 127 and acting on the splined shaft 52 is less than the torsional moment created by the gas spring 20 acting on the tiller arm 15. Thus, the net result is that the tiller arm 15 moves from whatever vertical position at which the operator left the tiller arm 15 when the dead-man brake inhibitor 40 was activated toward the 90 degree braking position, but more slowly than if the dead-man brake inhibitor 40 was not activated. For example, the torsional resistance created by the disk array 127 may be in a range of approximately 99.5% to approximately 98%, and preferably approximately 99% to approximately 98.5%, of the torsional moment created by the gas spring to cause the tiller arm 15 to creep toward the 90 degree braking position. As another example, the torsional resistance created by the disk array 127 may be sufficient to cause the tiller arm 15 to move toward the 90 degree braking position at a rate in the range of approximately 1 degree per hour to approximately 90 degrees per hour to cause the tiller arm 15 to creep toward the 90 degree braking position. In some embodiments, an electronic controller may communicate with the electromagnet 75 and with a shock sensor, such as an accelerometer or programmable MEMS device, and be programmed to momentarily increase the magnetic force exerted by the electromagnet 75, and thus increase the torsional resistance created by the disk array 127, for example, to a value greater than the torsional moment created by the gas spring, in response to a detected shock to the pallet truck 10, such as running over a dock plate or a wheel entering a divot in the floor.

In other embodiments, a position sensor may be included to detect the vertical position of the tiller arm 15 and communicate a position signal to a processor that communicates with the electromagnet 75. When the operator engages the dead-man brake inhibitor 40 and releases the control handle 25 the processor activates the electromagnet 75 based on the position signal. For example, if the tiller arm 15 is at one of a number of predefined vertical positions, the processor activates the electromagnet 75 with sufficient force to cause the torsional resistance created by the disk array 127 and acting on the splined shaft 52 to be greater than the torsional moment created by the gas spring acting on the tiller arm 15. If the tiller arm 15 is not at one of the number of predefined vertical positions, the processor activates the electromagnet 75 with sufficient force to cause the torsional resistance created by the disk array 127 and acting on the splined shaft 52 to be less than the torsional moment created by the gas spring acting on the tiller arm 15 such that the tiller arm creeps towards one of the predefined vertical positions. When the tiller arm 15 reaches one of the predefined vertical positions, the processor increases the actuation of the electromagnet 75 to effect sufficient force such that the torsional resistance created by the disk array 127 and acting on the splined shaft 52 is greater than the torsional moment created by the gas spring acting on the tiller arm 15. The tiller arm 15 may be held at one of the predefined vertical positions for a predetermined time period as described below.

In other embodiments a processor may be programmed to activate the electromagnet 75 in response to an operator action, such as pushing button 27, and to receive an input from one or more components of the pallet truck 10. The processor may be further programmed to deactivate the electromagnet 75 after passage of a predetermined period of time subsequent to activating the electromagnet 75, for example, one minute. In response to receiving an input from one of the components of the pallet truck 10, such as a subsequent depression of button 27 to activate a traction device, the processor may be programmed to restart a clock or other suitable device for determining the predetermined period of time, thus resetting the predetermined period of time that passes before the electromagnet 75 is deactivated.

If desired, the operator may reposition the tiller arm 15 to another vertical position, either up or down, while the dead-man brake inhibitor 40 remains engaged. Pushing upward on the tiller arm 15, that is toward the 90 degree braking position, will cause the disk array 127 to slip because the roller clutches 60 couple the tiller arm 15 to the splined shaft 50 such that torque transmission occurs for upward movement of the tiller arm 15. Overcoming the braking force generated by the disk array 127 is facilitated by the force of the gas spring that urges the tiller arm 15 in the upward direction.

Pushing downward on the tiller arm 15, that is toward the 0 degree braking position, will not cause the disk array 127 to slip because the roller clutches 60 decouple the tiller arm 15 from the splined shaft 50 such that torque transmission does not occur for downward movement of the tiller arm 15. Thus, the braking force generated by the disk array 127 does not need to be overcome to push the tiller arm 15 downward. However, the force of the gas spring that urges the tiller arm 15 in the upward direction needs to be overcome by the operator to move the tiller arm 15 downward.

In other embodiments, a force sensor may be operatively associated with the tiller arm 15 and configured to transmit a force signal to a processor when a force in addition to a force applied by a biasing device or opposite to the biasing device is applied to the tiller arm, for example a force urging the tiller arm toward the 90 degree braking position or the 0 degree braking position, respectively. The processor may be programmed to activate the electromagnet 75 in response to an operator action, such as pushing button 27. The processor may be further programmed to deactivate the electromagnet 75 in response to receiving the force signal subsequent to activating the electromagnet 75. The processor may be further programmed to re-activate the electromagnet 75 in response to cessation of the force signal. As with other embodiments, the tiller arm 15 may creep towards the 90 degree braking position, or may be held stationary for a predetermined time period.

In some embodiments, if the operator is driving the pallet truck 15 in rabbit mode, that is in a fast mode, and engages the dead-man brake inhibitor 40, an on-board processor causes the pallet truck 15 to slow to a predefined speed, for example, approximately 6 km/hr. Once the predefined speed has been reached, the electromagnet 75 will energize thus restricting movement of the tiller arm 15 from its current vertical position.

In other embodiments, a brake assembly may include a mechanical actuator such as a lever or pull handle that is used to activate a brake arrangement, such as disk array 127. In such an embodiment, the brake assembly preferably applies a force that is less than a force operating to urge the tiller arm 15 to the 90 degree braking position that will activate a dead-man brake. Preferably, moving the tiller arm 15 from the 90 degree braking position resets the mechanical actuator to an inactive position for the brake assembly.

It will be apparent to those skilled in the art that various modifications and variations can be made to the systems and methods of the disclosure. For example, a housing constructed with stand-offs may secure the electromagnet 75 and the piston 65 in place and provide a suitable gap between the two. Or, various aspects of the techniques and apparatuses described above for inhibiting without preventing movement of the tiller arm 15 due to force from a biasing device may be combined. Other embodiments of the methods and systems will be apparent to those skilled in the art from consideration of the specification and practice of the methods and systems disclosed herein. It is intended that the specification and examples be considered as exemplary only, with a true scope of the invention being indicated by the claims and their equivalents.

The invention claimed is:

1. A brake assembly comprising:
    a steering housing;
    a steering arm coupled to the steering housing;
    a biasing device connected between the steering arm and the steering housing and configured to apply torque to the steering arm to urge the steering arm toward a braking position; and
    a dead-man brake inhibitor operatively connected to the steering arm and configured to inhibit, but not prevent, movement of the steering arm toward the braking position under the influence of the biasing device in response to activation of the dead-man brake inhibitor.

2. A brake assembly according to claim 1, further comprising:
    a processor operatively connected to the dead-man brake inhibitor for controlling actuation of the dead-man brake inhibitor; and
    a truck component operatively connected to the processor for transmitting a signal to the processor wherein the transmitted signal indicates activation of the dead-man brake inhibitor.

3. A brake assembly according to claim 2, wherein the configuration of the dead-man brake inhibitor to inhibit, but not prevent, movement of the steering arm comprises the processor programmed to de-actuate the dead-man brake inhibitor after a predetermined time period elapses after actuation of the dead-man brake inhibitor.

4. A brake assembly according to claim 3, wherein the processor is further programmed to restart the predetermined time period in response to receiving a signal indicating operator interaction with a vehicle.

5. A brake assembly according to claim 2, further comprising:
    a force sensor operatively connected to the steering arm and the processor and configured to transmit an engagement force signal to the processor in response to an engagement force that is in addition to, or opposite to, a force resulting from the torque applied by the biasing device to the steering arm; and
    wherein the processor is programmed to de-actuate the dead-man brake inhibitor in response to receiving the engagement force signal and is further programmed to actuate the dead-man brake inhibitor in response to cessation of the engagement force signal.

6. A brake assembly according to claim 2, wherein the configuration of the dead-man brake inhibitor to inhibit, but not prevent, movement of the steering arm comprises the processor programmed to actuate the dead-man brake inhibitor and cause the dead-man brake inhibitor to apply a torque resistance to the steering arm that is less than the torque applied to the steering arm by the biasing device.

7. A brake assembly according to claim 6, wherein the torque resistance applied to the steering arm that is less than the torque applied to the steering arm by the biasing device causes the steering arm to move toward the braking position at a rate in the range of 1 degree per hour to 90 degrees per hour.

8. A brake assembly according to claim 6, further comprising a shock sensor operatively communicating with the processor, wherein the processor is programmed to further control the dead-man brake inhibitor by (i) increasing the torque resistance applied to the steering arm to a value that is greater than the torque applied to the steering arm by the biasing device in response to receiving a signal from the shock sensor and (ii) returning the torque resistance applied to the steering arm to a value that is less than the torque applied to the steering arm by the biasing device after increasing the torque resistance applied to the steering arm to a value that is greater than the torque applied to the steering arm by the biasing device.

9. A brake assembly according to claim 6, further comprising a position sensor associated with the steering arm for detecting a vertical position of the steering arm and operatively connected to the processor;
    wherein the torque resistance applied to the steering arm that is less than the torque applied to the steering arm by the biasing device causes the steering arm to move toward a predefined vertical position;
    wherein the processor is programmed to receive a signal from the position sensor indicating when the steering arm is at the predefined vertical position; and
    wherein the processor is further programmed to increase the torque resistance applied to the steering arm to become greater than the torque applied to the steering arm by the biasing device for a predetermined time period in response to receiving the signal from the position sensor indicating when the steering arm is at the predefined vertical position.

10. A brake assembly comprising:
    a steering housing;
    a steering arm coupled to the steering housing;
    a biasing device connected between the steering arm and the steering housing and configured to apply torque to the steering arm to urge the steering arm toward a braking position; and
    a dead-man brake inhibitor configured to apply resistance against the torque applied by the biasing device when the dead-man brake inhibitor is activated;
    wherein the steering arm is coupled to the steering housing and to the dead-man brake inhibitor such that movement of the steering arm toward the braking position transmits torque to the dead-man brake inhibitor when the dead-man brake inhibitor is active and movement of the steering arm away from the braking position does not transmit torque to the dead-man brake inhibitor when the brake assembly is active;
    the steering arm is operatively connected to a first shaft such that movement of the steering arm toward the braking position transfers torque to the first shaft and movement of the steering arm away from the braking position does not transfer torque to the first shaft; and the dead-man brake inhibitor is operatively connected to the first shaft such that activation of the dead-man brake inhibitor provides torsional resistance against movement of the steering arm toward the braking position but does not provide torsional resistance against movement of the steering arm away from the braking position.

11. A brake assembly according to claim 10, further comprising:
   a one-way roller clutch attached between the first shaft and the steering arm; and
   a second shaft located in a longitudinal aperture running the length of the first shaft such that the first shaft is configured to rotate about the second shaft and the second shaft is configured to longitudinally translate within the longitudinal aperture;
   wherein the dead-man brake inhibitor comprises;
      a brake actuator connected to a first end of the second shaft; and
      braking components connected to a second end of the second shaft and configured to be brought into engagement by the brake actuator.

12. A brake assembly according to claim 11, wherein:
   the brake actuator comprises an electromagnet and a piston separated by a gap when the electromagnet is de-energized, and the piston is attached to the first end of the second shaft; and
   the braking components comprises at least one brake disk secured to the first shaft for rotation therewith and an end cap attached to the second end of the second shaft, wherein the end cap is sized and positioned to press the at least one brake disk against a non-rotational member when the electromagnet is energized and decreases the gap between the electromagnet and the piston by attracting the piston toward the electromagnet.

13. A method of operating a vehicle having a dead-man brake comprising:
   receiving a dead-man brake actuation; and
   in response to the dead-man brake actuation, activating a dead-man brake inhibitor such that the dead-man brake inhibitor creates a resistance that inhibits a dead-man brake from being applied by a biasing device, but does not prevent the dead-man brake from being applied 4 the biasing device.

14. The method according to claim 13, wherein the dead-man brake inhibitor creates a resistance that inhibits a dead-man brake from being applied by a biasing device, but does not prevent the dead-man brake from being applied by the biasing device by generating a resistance that is less than a force acting to apply the dead-man brake.

15. The method according to claim 13, wherein receiving the dead-man brake actuation comprises receiving an inhibition signal at a processor, and in response to receiving the inhibition signal further comprising:
   via the processor, starting a timer to measure a predetermined time period; and
   wherein the dead-man brake inhibitor creates a resistance that inhibits a dead-man brake from being applied by a biasing device, but does not prevent the dead-man brake from being applied by the biasing device by generating a resistance that comprises;
      via the processor, determining that the predetermined time period has not elapsed and activating the dead-man brake inhibitor to create a counter-force that is greater than a force acting to actuate the dead-man brake; and
      via the processor, deactivating the dead-man brake inhibitor in response to determining that the predetermined time period has elapsed.

16. The method according to claim 15, wherein the processor is further programmed to:
   receive an input signal indicating an operator interaction with the vehicle; and
   in response to receiving the input signal indicating operator interaction with the vehicle, restarting the timer to measure the predetermined time period.

17. The method according to claim 13, wherein receiving the dead-man brake actuation comprises receiving an inhibition signal at a processor, and in response to receiving the inhibition signal, via the processor, activating the dead-man brake inhibitor to create a counter-force that is less than a force acting to actuate the dead-man brake.

* * * * *